July 2, 1968     M. P. LYNCH ET AL     3,390,430
EXTRUSION DIE SHELL ADJUSTING DEVICE
Filed June 8, 1966     2 Sheets-Sheet 1
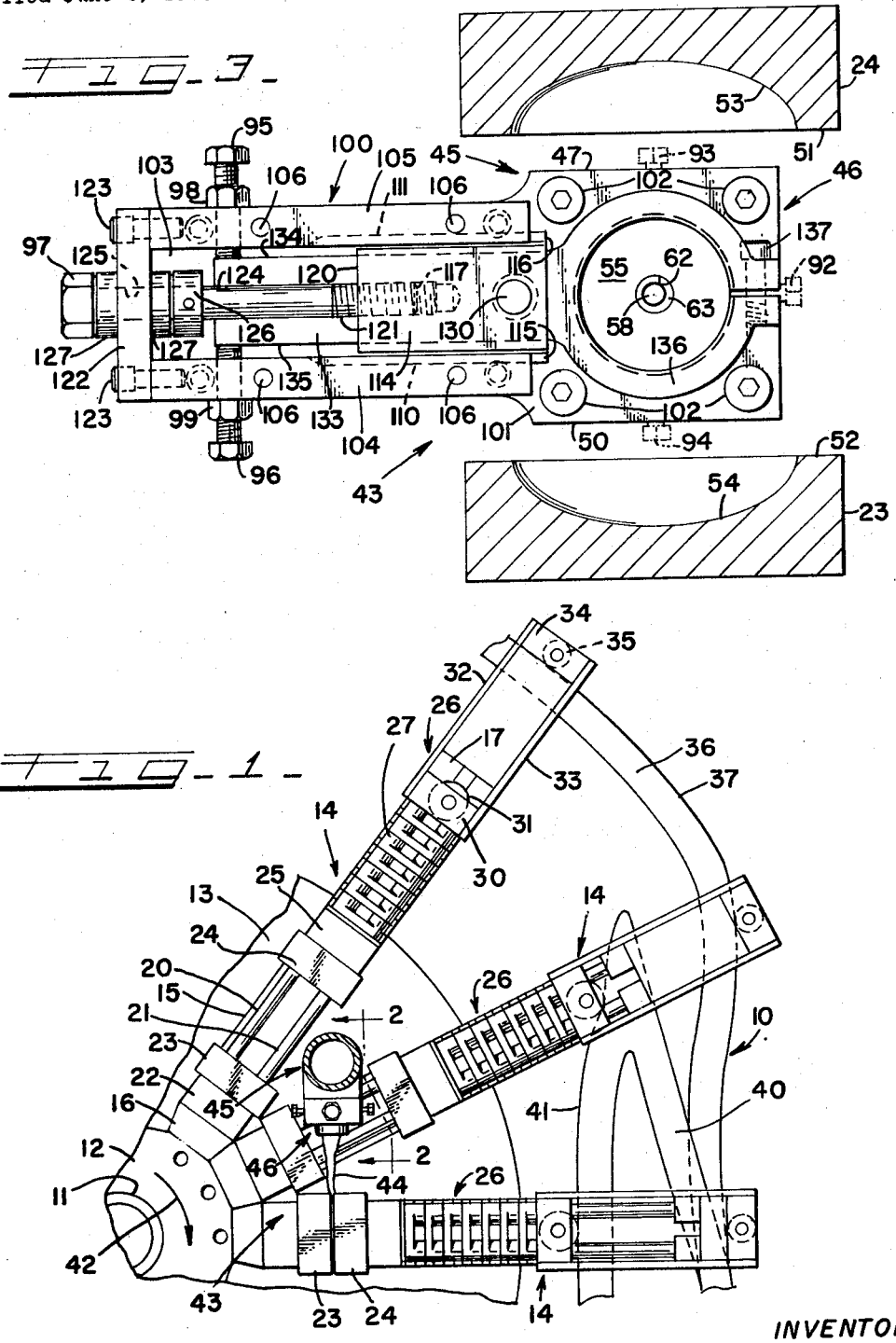
INVENTORS
MARVIN P. LYNCH
HERBERT Y. HOLCOMB
BY Walter H Beland
AGENT

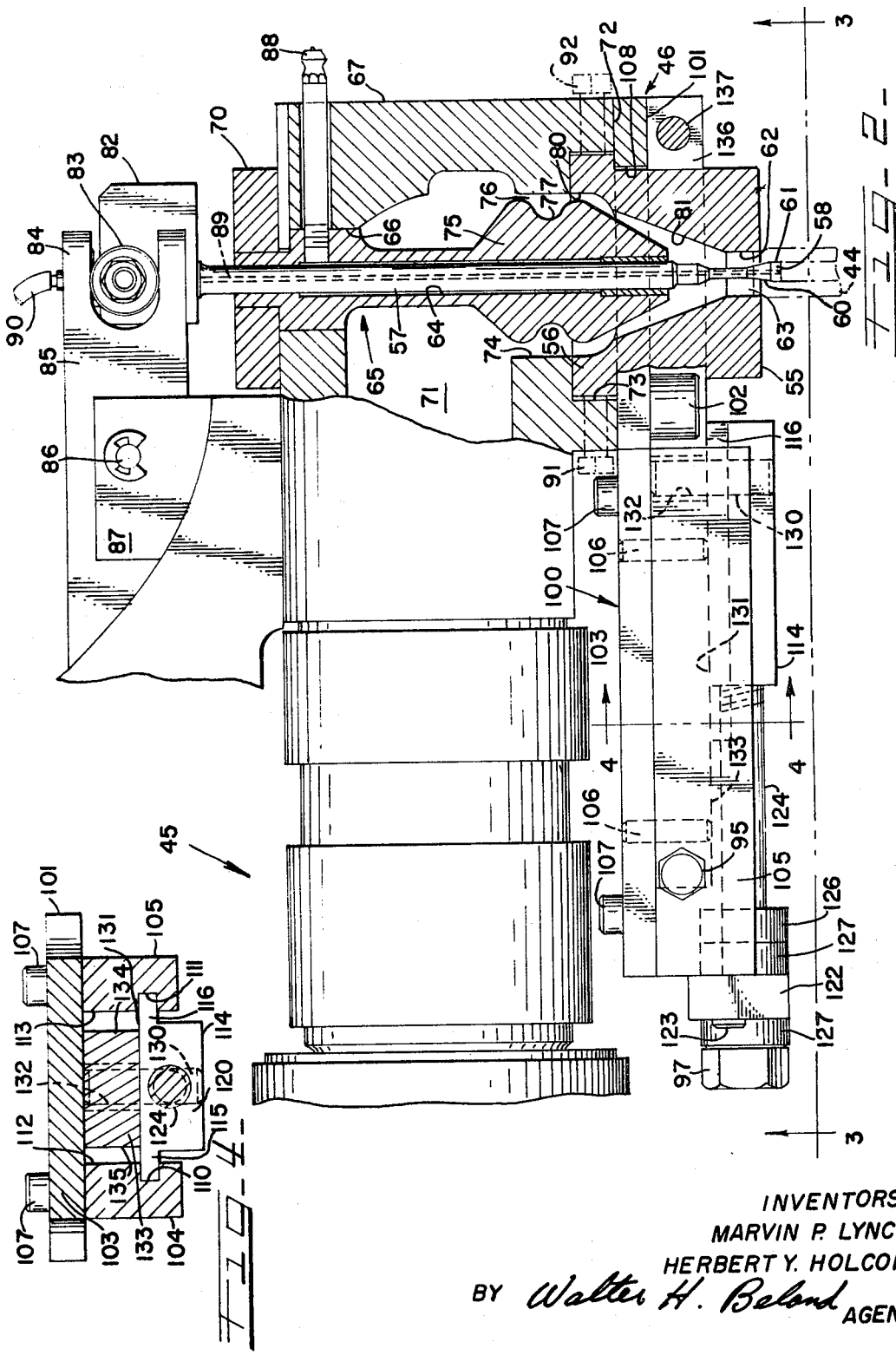

United States Patent Office 3,390,430
Patented July 2, 1968

3,390,430
EXTRUSION DIE SHELL ADJUSTING DEVICE
Marvin P. Lynch, Annapolis, and Herbert Y. Holcomb, Baltimore, Md., assignors to Continental Can Company, Inc., New York, N.Y., a corporation of New York
Filed June 8, 1966, Ser. No. 556,165
9 Claims. (Cl. 18—5)

ABSTRACT OF THE DISCLOSURE

An extrusion die assembly for delivering hot plastic material in the form of a tube to a blow molding machine which forms hollow plastic articles from the tube. The blow molding machine is provided with separable mold halves that move along a predetermined path. The extrusion die assembly includes a die shell having an extrusion die opening and a die core having a tip that extends into the die opening. Adjusting means are located beyond the path of the mold halves to permit lateral adjustment of the die shell with respect to the die core while the blow molding machine is operating.

---

The present invention relates to improvements in machinery now commonly employed for high volume production of blow molded articles such as, for example, plastic bottles for household detergents.

One type of machine now commonly used for the manufacture of such blow molded articles is described and illustrated in U.S. Patent No. 2,784,452 issued Mar. 12, 1957 to H. S. Ruekberg et al. and entitled "Vertical Machine With Radially Moving Molds for Forming Hollow Articles." This machine includes a horizontally disposed main shaft about which is disposed a plurality of mold units that extend radially outwardly from a hub on the shaft with the mold units lying in a plane normal to the shaft axis and being equally spaced around the shaft. Each of the mold units includes a fixed mold half and a movable mold half. The fixed mold halves of the mold units are closely spaced about the periphery of the hub on the main shaft of the machine. The movable mold halves of the mold units are arranged to slide on rods that extend in a direction radially outwardly from the main machine shaft. Associated with the movable mold halves is a pair of cam followers. One of the cam followers is positioned to contact a fixed cam surface that urges the cam follower and associated mold half radially inwardly toward the fixed mold half, causing the mold halves to assume a closed position in which they define a mold cavity for molding a hollow plastic object such as a detergent bottle. The other cam follower, associated with each mold unit, is adapted to contact a stationary mold opening cam surface upon the completion of a molding operation, causing the movable mold half to move radially away from the fixed mold half so that the mold halves are separated to permit the ejection of a molded article from the mold unit. The mold opening cam surface will retain the mold units in an open position until they pass beyond the charging station, at which they are charged with a length of synthetic organic thermoplastic material in the form of a hollow tube. The tube is provided by means of a plastic extrusion device that extrudes the tube of plastic material in a substantially vertical downward direction between the open mold halves of each of the mold units just prior to the closing of the mold units. When the mold units are closed they pinch off portions of the extruded tube so as to form a pinched off tube portion in each of the closed molds. One of the mold halves of each mold unit is provided with a needle that is movable by means of an air cylinder in a direction radially toward and away from the axis of the pinched off tube portion. Upon closing of the molds, the needle is caused to be projected through the wall of the pinched off tube portion trapped between the mold halves of a mold unit so that it pierces the tube wall. The needle is hollow, and once it has pierced the tube wall, compressed air is directed through the needle into the pinched off tube portion causing the inflation of the pinched off tube portion into conformance with the shape of the mold cavity so as to blow mold an article therein.

In the past, setting up such a machine for commercial operation involved a considerable amount of time and labor and also resulted in the extrusion of a considerable amount of waste plastic tubing that had to be reprocessed before it could be used again. The main difficulty involved in setting up a machine for production was in achieving the production of a tube of plastic being extruded that had a uniform wall thickness. The usual tube extrusion die assembly includes a cylindrically shaped die shell that contains a circular die opening concentric with the axis thereof. Concentrically positioned with respect to the circular die opening is a die core that extends coaxially upwardly through the die shell and through the extrusion die assembly or head. The die core is circular in cross section and has a tip portion that determines the inside diameter of the plastic tube being extruded. The circular opening in the die shell generally determines the outer diameter of the tube being extruded with some variation in the outer diameter being possible by means of adjustments to the axial position of the tip of the die core with respect to the die opening in the die shell.

One would think that if the tip of the die core were positioned perfectely concentrically in the opening in the die shell that the plastic tube being extruded would have an even wall thickness. In practice it has been found, however, that due to temperature and pressure gradients existing in the plastic material in the plane of the annular extrusion orifice formed between the tip of the die core and the opening in the die shell that a perfectly centered die core will rarely result in the production of a tube having an even wall thickness throughout its circumference. For this reason, it has been the practice to make the die shell adjustable in radial directions with respect to the die core in order to achieve a tube having uniform wall thickness despite the usual temperature and pressure gradients encountered at the annular extrusion orifice. This adjustment of the die shell with respect to the die core is very critical and usually must be made for each production run of a molding machine in order to produce tubes having even wall thickness. In the past, this adjustment has been accomplished by means of four centering screws arranged 90° apart around the circumference of the die shell as illustrated and explained in U.S. Patent No. 3,019,481 issued Feb. 6, 1962, to Kaiji Negoro and entitled "Variable Orifice Extrusion Die." The technique employed was to initially start out with the die core centered in the die shell; plastic pellets would then be fed into the hopper of the extruding device and extruded therethrough by means of the usual feed screw. The plastic would be heated to the desired temperature by the usual electric heating devices employed and as the platic was extruded through the annular orifice opening the desired tube was continuously produced. The tube produced was directed between the open mold halves of the plastic molding machine and the molding machine was started to commence production of hollow blow molded articles. As the articles were produced, they were examined to determine the distribution of the plastic therein. If the plastic was found to be distributed more to one side of the articles and less to the opposite side, such as would be caused by an unevenness in the wall thickness of the tube being extruded, the machine was stopped and appropriate adjustments made to the adjusting screws so as to reposition the die shell with respect to the die core in an effort to obtain more even distribution of the plastic in the finished articles. When the machine was shut down in order to make this adjustment, the plastic would continue to extrude from the annular die orifice opening for a considerable length of time after the extruder was shut off because of the pressure built up in the plastic. It was, therefore, necessary to gather up the length of plastic tubing extruded while the molding machine was stopped and reprocess it. It was necessary to stop the molding machine in order to adjust the die shell adjusting screws in accordance with the prior art, in that these screws were positioned right between the open mold halves just before they were closed and it was thus too dangerous for a workman to make this adjustment with the machine running due to the great danger of getting his hand crushed between the closing mold halves. Unless the technicians setting up the machine for operation were very lucky, it would usually take several interruptions in the production of the molding machine and adjustments of the die shell in order to obtain the desired even distribution of plastic in the finished molded articles.

In accordance with the teachings of the present invention, it is no longer necessary to stop the molding machine to make adjustments in the position of the die shell with respect to the die core, in that new and novel adjusting means are provided permitting a worker to make the necessary adjustments at a safe distance from the closing mold halves while the extruding device and molding machine are operating. It is accordingly the main object of the invention to provide a new and novel adjusting device for adjusting the position of the die shell with respect to the die core of an extrusion device associated with a plastic article blow molding machine permitting the adjustments to be safely performed while the extrusion device and blow molding machine are in operation.

The new and novel die shell adjusting device, in accordance with the present invention, employs only three adjusting screws for performing the required adjustments to the die shell whereas formerly four adjusting screws were required, and it is thus a further object of the invention to provide simpler and more expeditious adjusting means for adjusting the position of the die shell.

The new and novel die shell adjusting device, in accordance with the present invention, is for the most part fabricated from standard parts purchasable on the open market with the remainder of the parts being readily made by conventional machining operations with the result that the entire device may be easily and cheaply fabricated. It is, therefore, a still further object of the invention to provide a new and novel die shell adjusting device that may be easily and cheaply fabricated.

Still other and further objects and advantages of the invention will become apparent by referring to the following detailed description of a preferred embodiment of the invention as depicted in the accompanying drawings in which:

FIG. 1 is a fragmentary elevational view of a portion of a blow molding machine of the type set forth in the aforementioned Ruekberg et al. Patent No. 2,784,452 and having associated therewith a plastic extrusion device having the improved die shell adjusting device in accordance with the invention.

FIG. 2 is an enlarged fragmentary elevational view, partly in section, of the plastic extrusion device, including the new die shell adjusting means, taken along section line 2—2 of FIG. 1;

FIG. 3 is a reduced size bottom view of the new die shell adjusting means taken along section line 3—3 of FIG. 2; and FIG. 4 is a transverse sectional view taken along section line 4—4 of FIG. 2 showing a section through the new die shell adjusting means.

With reference to FIG. 1 of the drawings, the blow molding machine, of which only a portion is illustrated, is referred to generally by the numeral 10. Blow molding machine 10 includes a horizontally extending, hollow, rotatable main shaft 11 which is caused to rotate continuously in a clockwise direction by means of a drive unit which is not illustrated. Affixed to the shaft 11 for rotation therewith is a hub 12. Fixedly attached to the hub 12 is a circular mold supporting plate 13.

A plurality of mold units generally indicated by the numeral 14 are equally spaced about the periphery of the hub 12 and extend radially outwardly therefrom in a common plane normal to the axis of the shaft 11 in a manner similar to the spokes of a wagon wheel. Each of the mold units 14 includes an arm base plate 15 that is fixedly mounted on the mold supporting plate 13. The arm base plate 15 includes an inner arm end and an outer arm end that extend outwardly from the base plate and normal thereto. The inner arm end is indicated by the numeral 16 and the outer arm end is indicated by the numeral 17. A pair of round parallel rods indicated at 20 and 21 extend between the inner and outer arm ends and have their terminal end portions securely held in the inner and outer arm ends 16 and 17. Attached to the inner arm end 16 is an inner mold holding block 22 and an inner fixed mold half 23 is in turn removably secured to the inner mold holding block 22 in a conventional manner.

An outer movable mold half 24 is likewise secured to an outer mold holding block 25. The outer mold holding block 25 is slideably mounted on the rods 20 and 21 to effect the opening and closing of the mold halves 23 and 24. The outer mold holding block 25 is a part of a slidable mold positioning assembly generally indicated by the numeral 26. The mold positioning assembly 26 includes a plurality of spacer blocks 27 that are clamped between an actuator block 30 and the outer mold holding block 25 so as to space these blocks apart a desired amount. Actuator block 30 has a mold closing roller 31 rotatably journaled therein. Fixedly attached to the sides of the actuator block 30 is a pair of straps 32 and 33 that are employed to support a roller block 34 therebetween. Suitably journaled on the roller block 34 is a mold opening roller 35. The mold opening roller 35 cooperates with a fixed mold opening cam 36 having a mold opening cam surface 37 employed to cause the slidable mold positioning assembly 26 to slide outwardly on the rods 20 and 21 so as to separate the mold halves 23 and 24.

A second fixed cam 40 having a mold closing cam surface 41 is employed to cooperate with the mold closing roller 31 of the slidable mold positioning assembly 26 to effect the movement of the mold positioning assembly radially inwardly along the rods 20 and 21 so as to effect the closing of the mold halves 23 and 24.

It is to be understood that the mold units 14 will be sequentially opened and closed by the respective cams 36 and 40 as they revolve in a clockwise direction, indicated by the directional arrow 42, about the axis of the shaft 11 as a result of the rotation imparted to the shaft 11 by the drive means. The portion of the blow molding machine 10 illustrated in FIG. 1 includes the mold charging station generally indicated at 43. At this station the mold units are charged with portions of plastic tubing 44 being continuously downwardly extruded from a plastic extrusion device of conventional design indicated generally by the numeral 45. The plastic extrusion device 45 includes an extrusion die assembly or head indicated generally at 46 that fits between the open mold halves 23 and 24 at the charging station just before the mold halves close and clamp off a portion of the plastic tubing therebetween. As the charged and closed mold halves 23 and 24 move around the axis of the shaft 11 the portion of plastic tube clamped therebetween will be pierced by a hollow needle operated by an air cylinder and compressed air will be delivered through the needle into the clamped off tube portion to inflate it into conformance with the shape of a mold cavity defined between the mold halves 23 and 24. The mold halves are cooled by means of cooling water circulated therein so as to set up the plastic article being molded by the time the mold halves are opened for removal of the blow molded article at an article discharge station at a point in the path of travel of the mold unit 14 above the shaft 11. Before the mold halves are opened, of course, the inflating needle is retracted by means of the air cylinder and the superatmospheric pressure in the molded article is released.

In FIG. 3 it will be seen how the extrusion die assembly 46 of the plastic extrusion device 45 is positioned between the opened mold halves 23 and 24 at the mold charging station 43. For the sake of simplicity of illustration in FIG. 3, the mold halves 23 and 24 are depicted as being evenly spaced from and parallel to the side faces of the extrusion die assembly 46, whereas, in reality, the mold halves, as shown in FIG. 1, are at an angle of approximately 30° with respect to the side faces of the extrusion die assembly 46. The side faces of the extrusion die assembly 46 are designated at 47 and 50 in FIG. 3 with the opposing mold closing faces being indicated at 51 and 52. Outer movable mold half 24 has a die cavity portion 53 that opens through the mold closing face 51. Likewise, the inner fixed mold half 23 has a die cavity portion 54 opening through the mold closing face 52. When the mold halves 23 and 24 are brought together into closed relationship, the faces 51 and 52 abut each other so that the cavity portions 53 and 54 form a complete die cavity mold for molding a hollow plastic article therein.

Referring to FIG. 2 of the drawings, it will be observed that the extrusion die assembly 46 of the plastic extrusion device 45 includes a cylindrically shaped die shell indicated by the numeral 55. Die shell 55 includes at its upper end an enlarged diameter cylindrical retaining head 56 which is employed to retain the die shell in position with respect to a vertically reciprocatable round die core indicated at 57. At its lower end, the die core 57 has a tip 58 that tapers inwardly at 60 and terminates in a cylindrically shaped portion 61. The tip 58 projects through a circular extrusion die opening in the die shell 55 indicated by the numeral 62 so as to form an annular extrusion die orifice opening 63 between the circular extrusion die opening 62 and the tapered portion 60 of the tip 58 of the vertically reciprocatable die core 57. The die core 57 is adapted to reciprocate vertically in a bore 64 of a mandrel generally indicated at 65.

Mandrel 65 fits into a bore 66 in a die block portion 67 of the extrusion die assembly 46. A suitable fastener 70 retains the mandrel in a fixed position in the die block 67. The mandrel 65 extends downwardly into a passage 71 formed in the die block 67 for the passage of molten plastic material therethrough. Die block 67 has a bottom face 72 having a circular recess therein sized so as to freely receive the enlarged cylindrical retaining head portion of the die shell 55.

A portion of the passage 71 extends downwardly and opens into the circular recess 73. This portion of the passage 71 is indicated at 74. Passage portion 74 is in the form of a circular bore having a central axis that coincides with the longitudinal axis of the die core 57. At its lower end the mandrel 65 has an enlarged head that is circular in transverse cross section and the enlarged head portion indicated at 75 is concentrically disposed within the cylindrical bore 74 so as to form an annular channel 76 between the outer peripheral surface of the head portion 75 and the wall of the bore 74. The peripheral surface of the enlarged head portion 75 is provided with a smooth circular groove as indicated at 77 so as to make the width of the channel 76 vary throughout its length for the purpose of working the molten plastic material passing through the annular channel 76 to disorient the plastic and to minimize temperature and pressure differentials existing therein. A bore 80 having a curved lower wall portion is provided through the upper surface of the enlarged cylindrical retaining head 56 of the die shell 55 in alignment with the bore 74 in the die block 67. A tapered bore 81 in the die shell 55 communicates the extrusion die opening 62 with the bore 80 so as to connect annular channel 76 with the annular orifice opening 63 permitting the flow of molten plastic material through the annular orifice opening 63 resulting in the formation of the soft plastic tube 44.

At its upper end, which extends out of the die block 67, the die core 57 is provided with a mounting block 82 that carries a cam roller 83. Cam roller 83 is received in a bifurcated end portion 84 of an operating lever 85. Lever 85 is pivotably connected by means of a pin 86 to a block 87 that is in turn suitably attached to the die block portion 67 of the extrusion die assembly 46. It will be apparent that when the lever 85 is moved in a clockwise direction about the pin 86, it will cause the die core 57 to move in a downward direction resulting in the tapered portion 60 at the lower end of the die core being moved downwardly so as to increase the size of the annular orifice opening 63 which results in a thickening of the wall of the plastic tube 44 being extruded. Conversely, when the lever 85 is rotated counter-clockwise about the pin 86, the tapered portion 60 will move upwardly so as to decrease the size of the annular orifice opening 63 resulting in a tube 44 having a thinner wall. At its opposite or leftward end, which is broken away, the lever 85 is connected to the piston rod of an air cylinder or other suitable actuating means, which in turn is operated in timed relationship with the movement of the mold units 14 (FIG. 1) so as to provide variations in the wall thickness of the tube 44 at places along its length that correspond with locations in the die cavity portions 53 and 54 of the mold halves 24 and 23, respectively, that require more or less plastic material, as the case may be, depending upon the amount of expansion of the plastic tube necessary at the locations in order to expand the tube into conformance with the cavity wall so as to achieve the desired wall thickness of the finished blow molded article at the corresponding locations throughout the length of the die cavity.

The just explained technique by which the wall thickness of the tube being extruded may be varied as desired along its length is known in the trade as "Variable Extrusion," and, if desired, a more complete understanding of this technique may be obtained by referring to the before mentioned Negoro Patent 3,019,481. Although the illustrated extrusion die assembly 46 is of the variable extrusion type, it is to be understood that as far as the present invention is concerned, the die core 57 may be of the fixed position type with the result that the tube 44 being extruded will have an unvarying wall thickness throughout its length.

With the illustrated variable extrusion die assembly 46 it is necessary to provide lubrication to the bore 64 in which the die core 57 reciprocates, and this is accomplished by means of the lubrication fitting 88. Also, in order to prevent the tube 44 from collapsing, air pressure is provided to the interior thereof through a small bore 89 that extends through the length of the die core 57. An air hose 90, connected to the upper end of the die core 57, furnishes air under pressure to the bore 89 from a suitable source not illustrated.

As also illustrated in Negoro Patent 3,019,481, the die shell 55, in accordance with the practice of the prior art, was laterally shiftable in the circular recess 73 by means of four centering screws spaced 90° apart around the enlarged cylindrical retaining head portion 56 of the die shell 55 so that the ends thereof abutted the vertical side wall of the enlarged cylindrical head 56. Such prior art centering screws are illustrated in phantom outline in FIGS. 3 and 4 are designated by the numerals 91–94. Such prior art centering screws were threaded into the die block 67 or into a suitable clamp plate used to clamp the retaining head 56 in its adjusted position upon completion of the adjusting operation accomplished by the appropriate turning of the centering screws 91–94. The reason that it was necessary to stop the molding machine 10 for each adjustment of the die shell by means of the centering screws 91–94 will be readily apparent in FIG. 3, where it will be seen that screws 92–94 are positioned between the open mold halves 23 and 24 as is also screw 91 which is hidden from view in FIG. 3. Since, during the operation of the machine 10, the mold halves 23 and 24 of the mold units 14 would be sequentially moving past the extrusion die assembly 46 and then closing about the tube 44 immediately upon clearing the extrusion die assembly, it would be too great a risk for a worker to attempt an in-motion adjustment in view of the possibility that he might get his hand caught between the closing mold halves.

Still referring to FIG. 3 in particular, it will be seen that in accordance with the teachings of the present invention, three hexagon head adjusting screws designated as 95–97 are employed to effect the lateral positioning of the die shell 55 with respect to the tip 58 of the die core 57 so as to obtain a plastic tube 44 having an even wall thickness in a transverse plane therethrough. It will be apparent that the three adjusting screws 95–97, in accordance with the present invention, are well clear of the mold halves 23 and 24, so that it is possible for a worker to make the necessary adjustments thereto to properly position the die shell 55 while the blow molding machine 10 is in operation without there being any great danger involved if he is reasonably careful. The die shell adjusting device, in accordance with the invention, is generally indicated by the numeral 100, and includes a die shell clamping plate 101 that clampingly engages the undersurface of the enlarged cylindrical retaining head 56 of the die shell 55. The die shell 55 loosely fits through an oversize circular opening 108 in the clamping plate 101 so as to be laterally shiftable therein. Die shell clamping plate 101 is held in place adjacent the bottom face 72 of the die block 67 by means of four threaded fasteners 102 passing through suitable openings therethrough (not shown) and into threaded bores in the die block 67 which are also not illustrated.

Die shell clamping plate 101 has an extension arm portion 103 extending leftwardly, as viewed in FIG. 2, underneath and in line with the plastic extrusion device 45. A pair of depending side-rails, best shown in FIG. 4 and indicated by the numerals 104 and 105, extend in parallel relationship along the side edges of the extension arm portion 103 and are fastened thereto by means of threaded fasteners 107. To insure that the side-rails 104 and 105 do not shift, they are kept in accurate alignment by means of dowel pins 106. Opposing slide-ways 110 and 111 are provided in oppositely disposed faces 112 and 113 of the depending side-rails 104 and 105. A slide-block 114 is positioned between the rails 104 and 105 and has a pair of outwardly projecting and longitudinally extending slide-way fitting portions adapted to slidingly fit into the slide-ways 110 and 111. The slide-way fitting portions of the slide-block 114 are indicated by the numerals 115 and 116. Slide-block 114 is provided with a threaded bore 117 (FIG. 3) opening through a rear end face thereof 120; the end face being substantially perpendicular to the parallel side-rails 104 and 105. Adjusting screw 97 has a threaded end portion 121 that is received in the threaded bore 117 for adjusting the position of the slide-block 114 along the slide-ways 110 and 111. A cross piece 122 is connected across the left ends of the rails 104 and 105 as viewed in FIGS. 2 and 3 by means of recessed threaded fasteners 123. The shank 124 of the adjusting screw 97 passes through a suitable bore 125 in the cross piece 122 and the adjusting screw 97 is prevented from moving longitudinally in the bore 123 by means of a set collar 126 fixedly attached to the shank 124 by means of a pin or set screw. A pair of thrust collars 127 abut opposite side faces of the cross piece 122 permitting relatively easy turning of the adjusting screw 97 when the screw is subjected to the thrust forces normally encountered during adjustments thereof.

Adjacent its right end, slide-block 114 is provided with a vertically extending round dowel pin 130 that is force-fitted into a suitable bore therethrough that has not been indicated by a reference numeral. The dowel pin 130 extends through and above an upper horizontal flat surface 131 of the slide-block 114. The portion of the dowel pin 130 that extends above the slide-block 114 fits into a suitably bushed bore 132 in an adjusting arm 133. The adjusting arm 133 is free to pivot laterally on the upstanding dowel pin 130. Adjacent its left end, as viewed in FIG. 3, the threaded ends of the hex-headed adjusting screws 95 and 96 abut parallel side faces 134 and 135 of the adjusting arm 133 respectively. Lock nuts 98 and 99 are provided on adjusting screws 95 and 96 respectively to hold them firmly in position against the side faces of the adjusting arm 133. At its right end, as viewed in FIGS. 2 and 3, the adjusting arm 133 is in the form of an enlarged generally circular split type clamping ring indicated at 136. A clamping screw 137 is employed to tighten the clamping ring 136 about the die shell 55 which fits into the clamping ring 136.

It is to be understood that the thickness or depth of the enlarged cylindrical retaining head 56 of the die shell 55 is several thousandths of an inch greater than the depth of the circular recess 73 into which it fits, so that when the threaded fasteners 102 are tightened the die shell clamping plate 101 bears against the under surface of the retaining head 56 so as to firmly hold the die shell 55 in place. It is necessary, or at least desirable, to apply a high temperature lubricant to the upper and lower surfaces of the retaining head 56, the threads of the threaded fasteners 102, the clamping screw 137, slide-ways 110 and 111, adjusting screws 95–97, and the bushed bore 132.

When the die shell adjusting device 100 is mounted on the die block 67 by means of the threaded fasteners 102, it is important that the threaded fasteners 102 be just firmly snugged up against the die shell clamping plate 101 and not tightened with great force so that the retaining head 56 can slide laterally in the circular recess 73 without damage thereto when the adjusting screws 95–97 are adjusted.

*Operation*

The operation of the die shell adjusting device 100 of the invention attached to the extrusion die assembly 46 of the plastic extrusion device 45, in order to adjust the position of the die shell 55 with respect to the tip 58 of the die core 57 in horizontal directions, in order to achieve a desired distribution of plastic in the walls of hollow articles being blow molded in the blow molding machine 10 while articles are being produced will now be explained.

In order to commence molding operations, plastic pellets such as polyethylene pellets are supplied to a hopper (not shown) of the plastic extrusion device 45. The plastic extrusion device is heated by means of suitable electric heaters (not shown) employed to melt the plastic pellets. An extrusion screw, also not shown, which extends under the pellet hopper so as to receive a supply of plastic pellets therefrom is caused to rotate by energizing its drive system (not shown) causing the plastic pellets to be driven rightwardly, as viewed in FIG. 2, through the passage 71. The plastic pellets are heated to a sufficiently high temperature to cause them to melt and are subject to high pressure by the extrusion screw resulting in the plastic being in a molten state under high pressure by the time it reaches the area of the extrusion die assembly 46. The molten plastic passes through the annular channel 76 in which it is worked and disoriented to reduce temperature and pressure gradients. The molten plastic then passes through bore 80 and the tapered wall bore 81 out through the annular orifice opening 63 so as to form the hollow plastic tube 44. Before the extrusion operation just explained commences, the die shell 55 is adjusted by means of the adjusting screws 95–97 so as to be concentrically disposed about the cylindrical tip 58 of the die core 57. In order to prevent the tube 44 from collapsing due to atmospheric pressure, air under pressure is supplied through the hose 90 connected to the small bore 89 that passes longitudinally through the entire length of the die core 57 opening through the end of the cylindrical portion 61 of the tip 58.

Once the tube 44 is being produced substantially satisfactorily, the molding machine 10 is started in operation so that the mold units 14 revolve in a clockwise direction as indicated by the directional arrow 42 of FIG. 1 and the tube 44 is directed between the moving mold halves 23 and 24 resulting in the start of production of the blow molded articles to be produced. Some initial adjusting of the speed of the extrusion screw and the electric heating units associated with the plastic extrusion device 45 is usually necessary in order to synchronize the extrusion rate of the tube 44 being produced with the speed of rotation of the mold units 14 and to have the extruded plastic at the proper temperature for efficient blow molding. Once these adjustments have been taken care of, the articles being produced are examined in order to determine if the plastic is evenly distributed in the walls thereof. This can be done by cutting the articles apart in a transverse direction so that the wall thickness thereof in the transverse plane can be measured for evenness. With reference to FIG. 3 of the drawings, it may be found that the plastic article being blow molded in the mold formed by the die cavity portions 53 and 54 when the mold halves 23 and 24 are closed may be too thick in the mold cavity portion 53 and too thin in the mold cavity portion 54, in spite of the fact that the tip 58 of the die core 57 may be accurately centered within the circular die opening 62 in the die shell 55. Such unevenness is a result of small temperature and pressure gradients existing in the plastic being extruded. In order to achieve an even wall thickness under this circumstance, it is necessary to move the die shell 55 toward the mold half 23 and away from the mold half 24 so as to increase the size of the orifice opening 63 adjacent the die cavity portion 54, and simultaneously decrease the orifice opening adjacent the die cavity portion 53. This is accomplished by first loosening the lock nuts 98 and 99 on the respective adjusting screws 95 and 96 and then loosening the set screw 95 slightly. Set screw 96 is now tightened against the side face 135 of the adjusting arm 133 causing the adjusting arm 133 to be rotated very slightly in a clockwise direction about the dowel pin 130, as viewed in FIG. 3. This results in a slight clockwise movement, as viewed in FIG. 3, of the die shell 55 about the dowel pin 130 so as to increase the size of the annular orifice 63 on the side adjacent the die cavity portion 54 and decrease the orifice opening on the side adjacent the die cavity portion 53 in the desired manner. Some of the articles being continuously produced by the blow molding machine 10 after this adjustment is made are cut open and examined in order to see if the previous unbalance in wall thickness has been corrected. If it has been, the lock nuts 98 and 99 can now be tightened so as to retain the die shell 55 in the properly corrected position and commercial production can commence. If, on the other hand, more or less adjusting of the adjusting screws 95 and 96 is required, such further adjustments will be made while examining the cut apart finished articles until the desired even distribution of plastic in the article walls has been obtained and then the lock nuts 98 and 99 tightened so as to preserve the desired adjusted position of the die shell 55.

If it is found that the thickness of the wall of the molded articles formed in the mold cavity provided by the closed die cavity portions 53 and 54 is too thick adjacent the right side of the die cavity portions 53 and 54, as viewed in FIG. 3, and too thin adjacent the left side thereof, this unevenness in the distribution of plastic can be corrected by turning the adjusting screw 97 in a direction to cause the slide-block 114 to move leftwardly so as to decrease the size of the annular orifice opening 63 on the right side thereof and increase it on the left side. It may also require several adjustments of the adjusting screw 97 in order to eliminate this undesired unbalance in the wall thickness of the molded article, but since the blow molding machine 10 is operating while the adjustments are being made the adjustments can be made in a relatively short time and commercial production commenced immediately thereafter.

The theory of adjustment in positioning the die shell 55 is to cause it to move in the direction toward the thin wall portion of the article being molded and away from the thick wall portion. The die shell 55 can be made to move in any lateral direction necessary by making sequential adjustments to the screws 95 and 96 and the screw 97.

The adjustments effected by the adjusting device 100 are very small in magnitude; hence, although adjustments made to the screws 95 and 96 cause the die shell to be revolved about the dowel pin 130 in an arcuate path, for all practical considerations such adjustments to the die shell are substantially along a line at right angles to the directions of adjustment effected by the screw 97.

If desired, in order to make the new adjusting device 100 very safe to adjust, a suitable guard plate may be provided between the adjusting screws 95–97, as viewed in FIG. 3, and the mold halves 23 and 24 so that under no circumstances could a worker making adjustments to the screws 95–97 get his hand caught between the closing mold halves 23 and 24.

While the construction details and operation of a preferred embodiment of the invention have been illustrated and described it is to be understood that other and equivalent structural details may be resorted to within the spirit of the invention.

What is claimed is:

1. In apparatus for blow molding hollow articles from thermoplastic material including a blow molding machine having separable mold halves in which the articles are molded that move along a predetermined path; the combination comprising: a plastic extrusion device having an extrusion die assembly through which a tube of hot thermoplastic is extruded and delivered to the separable mold halves; the extrusion die assembly including a die shell having an extrusion die opening therein and a die core having a tip that extends axially into said die opening; a die shell adjusting device associated with the extrusion die assembly including an adjusting arm having an end thereof adapted to retain the die shell, and an opposite end extending radially away from the die shell; and adjusting means located beyond the path of the separable mold halves for moving the adjusting arm and the retained die shell in lateral directions with respect to the die core to permit adjusting the die shell while the blow molding machine is in operation.

2. In apparatus for blow molding hollow articles from thermoplastic material including a blow molding machine having separable mold halves in which the articles are molded that move along a predetermined path; the combination comprising: a plastic extrusion device having an extrusion die assembly through which a tube of hot thermoplastic is extruded and delivered to the separable mold halves; the extrusion die assembly including a die shell having an extrusion die opening therein and a die core having a tip that extends axially into said die opening; a die shell adjusting device associated with the extrusion die assembly comprising adjusting means located beyond the path of the separable mold halves for moving the die shell in lateral directions with respect to the die core to permit adjusting the die shell while the blow molding machine is in operation.

3. The combination as set forth in claim 1 in which the adjusting means for moving the adjusting arm includes a plurality of adjusting screws.

4. The combination as set forth in claim 1 in which the adjusting arm of the die shell adjusting device is provided with a split type clamping ring at the end thereof adapted to retain the die shell, into which the die shell fits, and which includes a clamping screw for tightening the clamping ring on the die shell.

5. The combination as set forth in claim 4 in which the die shell adjusting device additionally includes a die shell clamping plate having an opening therethrough with the die shell being adjustably positioned therein; the extrusion die assembly being further characterized by the provision of a die block portion having a bottom face with a recess therein; the die shell including an enlarged retaining head portion that fits into said recess so as to be laterally movable therein; fastening means for fastening the die shell clamping plate to the die block portion adjacent the bottom face thereof with the enlarged retaining head being held in the recess in the die block portion by the die shell clamping plate; the die shell clamping plate being further characterized in that it includes an extension arm portion extending radially away from the die shell in the same direction as the said opposite end of the adjusting arm; and the adjusting means being supported by the extension arm portion.

6. The combination as set forth in claim 5 in which the extension arm portion of the die shell clamping plate is provided with side-rails having slide-ways; a slide-block is provided arranged to slide in the slide-ways radially toward and away from the die core; pivot means is provided to pivotally connect the slide-block to the adjusting arm; the adjusting means including means for adjustably positioning the slide-block along the slide-ways so as to laterally adjust the adjusting arm and die shell in opposite directions with respect to the die core through the pivot connection; and the adjusting means also including means for adjustably pivoting the adjusting arm on the pivot means to laterally adjust the die shell with respect to the die core in direction substantially at right angles to the directions of adjustment effected by the slide-block adjusting means.

7. The combination as set forth in claim 6 in which the means for adjustably positioning the slide-block along the slide-ways comprises an adjusting screw fixed against longitudinal movement but free to rotate; the slide-block being provided with a threaded bore and the adjusting screw being provided with a threaded end that threads into the said threaded bore to effect movement of the slide-block in the slide-ways when the adjusting screw is turned.

8. The combination as set forth in claim 7 in which the means for adjustably pivoting the adjusting arm comprises a pair of adjusting screws disposed on opposite sides of the adjusting arm adjacent the said opposite end thereof; said pair of adjusting screws having ends that bear on the said opposite sides of the adjusting arm so as to adjustably retain the said opposite end of the adjusting arm therebetween.

9. The combination as set forth in claim 2 in which the adjusting means for moving the die shell includes a plurality of adjusting screws.

References Cited
UNITED STATES PATENTS

| | | |
|---|---|---|
| 2,044,961 | 6/1936 | Waner. |
| 3,019,481 | 2/1962 | Negoro. |
| 3,209,404 | 10/1965 | Hagen. |
| 3,283,363 | 11/1966 | Turner. |
| 3,321,805 | 5/1967 | Given. |

WILBUR L. McBAY, *Primary Examiner.*